United States Patent
Neuteboom et al.

(10) Patent No.: US 7,888,423 B2
(45) Date of Patent: Feb. 15, 2011

(54) POLYPROPYLENE COMPOSITION HAVING IMPROVED SCRATCH RESISTANCE

(75) Inventors: Peter Neuteboom, Hoensbroek (NL); Maria Soliman, Nievwstadt (NL)

(73) Assignee: Saudi Basic Industries Corporation, Riyadh (SA)

( * ) Notice: Subject to any disclaimer, the term of this patent is extended or adjusted under 35 U.S.C. 154(b) by 65 days.

(21) Appl. No.: 11/793,115

(22) PCT Filed: Nov. 30, 2005

(86) PCT No.: PCT/EP2005/012947

§ 371 (c)(1), (2), (4) Date: Jun. 14, 2007

(87) PCT Pub. No.: WO2006/063698

PCT Pub. Date: Jun. 22, 2006

(65) Prior Publication Data

US 2009/0105402 A1  Apr. 23, 2009

(30) Foreign Application Priority Data

Dec. 16, 2004 (EP) ................................. 04078423

(51) Int. Cl.
*C08L 23/00* (2006.01)
*C08F 8/00* (2006.01)
(52) U.S. Cl. ...................... 524/528; 525/191
(58) Field of Classification Search ............ 524/528
See application file for complete search history.

(56) References Cited

U.S. PATENT DOCUMENTS

| 5,585,420 A | * 12/1996 | Grasmeder et al. .......... 523/400 |
| 2004/0014891 A1 | 1/2004 | Krabbenborg et al. |
| 2006/0210801 A1* | 9/2006 | Sato et al. ................ 428/411.1 |

FOREIGN PATENT DOCUMENTS

EP  1591482  11/2005

OTHER PUBLICATIONS

Polymer Handbook, Brandrup et al. eds., John Wiley, 4th Edition, 1999.*
Andrew J. Peacock, Handbook of Polyethylene, pp. 1-5 (2000).

* cited by examiner

*Primary Examiner*—David Wu
*Assistant Examiner*—Hui Chin
(74) *Attorney, Agent, or Firm*—Jim Wheelington

(57) ABSTRACT

The invention relates to a polypropylene composition comprising:
(i) 30-97 wt. % of a polypropylene;
(ii) 2-20 wt. % of a branched low density polyethylene with a density between 910 and 935 kg/m$^3$ and a Melt Flow Index (MFI) between 0.1 and 100 g/10 min;
(iii) 1-20 wt. % of a copolymer of ethylene and a $C_3$-$C_{20}$ α-olefin with a density between 840 and 890 kg/m$^3$ and a Melt Flow Index (MFI) between 0.1 and 100 g/10 min; and
(iv) 0.5-60 wt. % of a filler,
wherein wt. % are calculated on the total amount of the polypropylene composition.

15 Claims, No Drawings

POLYPROPYLENE COMPOSITION HAVING IMPROVED SCRATCH RESISTANCE

The present invention is directed to a polypropylene composition having improved scratch resistance properties.

According to Wolsske et al. in the "Effect of composition on the scratch resistance of filled TPO's" (SPE; TPO conference; year 2001; pages 225-230) the enhancing of the scratch resistance of TPO's such as for example polypropylene is still an active goal of materials design to extend their use to high visibility exterior and interior automotive parts. Wolsske teaches that fatty acid amide based lubricants are effective in enhancing the scratch resistance.

It is the object of the present invention to provide a polypropylene composition having improved scratch resistance in combination with the other desired properties.

The present invention is characterized in that the polypropylene composition comprises:
(i) 30-97 wt. % of a polypropylene (PP);
(ii) 2-20 wt. % of a long-chain branched low density polyethylene (LDPE) with a density between 910 and 935 kg/m$^3$ and a Melt Flow Index (MFI) between 0.1 and 100 g/10 min;
(iii) 1-20 wt. % of a copolymer of ethylene and a $C_3$-$C_{20}$ α-olefin with a density between 840 and 890 kg/m$^3$ and a Melt Flow Index (MFI) between 0.1 and 100 g/10 min; and
(iv) 0.5-60 wt. % of a filler, wherein wt. % are based on the total weight of the polypropylene composition.

The presence of the specific combination of the specific branched low density polyethylene and the specific copolymer of ethylene and a $C_3$-$C_{20}$ α-olefin in the polypropylene composition enhances the scratch resistance.

Furthermore the polypropylene composition has an excellent combination of properties such as for example impact resistance, elongation at break, modulus and dimensional stability.

A further important advantage of the composition according to the present invention is that the composition can be injection moulded at a high injection rate while the moulded part thus obtained does not exhibit (or at least exhibits them to a strongly reduced extent) surface defects in the form of a stripe or a pattern.

The polypropylene in the composition according to the invention may be a homopolymer as well as a copolymer, particularly all kinds of reactor copolymers, for instance block copolymers (blends of a homopolymer and a rubber, for instance an EPR rubber) may be used. Many types of polypropylene are commercially available and they can be readily prepared by methods well known and extensively described in the art using for instance conventional Ziegler-Natta catalysts as well as single site catalysts, for instance metallocene catalysts. Of course, also mixtures of different types of polypropylene can be used.

The MFI of the polypropylene (measured in accordance with ISO 1133 using a 2.16 kg weight and at a temperature of 230° C.) may range between wide limits, for instance between a lower limit of 0.1 g/10 min and an upper limit of 100 g/10 min. Preferably the lower limit is 10 g/10 min and more preferably the lower limit is 20 g/10 min.

Generally, the polypropylene homopolymer has an isotactic structure, which means that the isotacticity is high, for instance higher than 95% and preferably higher than 98%.

According to another preferred embodiment of the invention the propylene is a copolymer of propylene and of an olefin other than polypropylene. The olefin other than propylene may be for instance an α-olefin, in particular 1-alkene having for instance 2 or 4-20 C-atoms or cyclic olefins, optionally containing more than one ring, having a double bond in the ring structure. Examples of suitable olefins include ethylene, butene, hexene, styrene, cyclopentene and/or norbornadiene.

Preferably, the α-olefin is a 1-alkene having 2 or 4-8 C-atoms.

More preferably, the α-olefin is ethylene.

According to a further preferred embodiment of the invention the composition comprises 60-80 wt % polypropylene.

In order to enlarge the impact resistance the polypropylene may contain rubber. The polypropylene composition may comprise in an amount of, for instance, 0-30 wt. % of a rubber, preferably 5-20 wt. %, with a comonomer content of, for instance 10-70 wt. %, preferably 30-65 wt. %.

Preferably, the rubber is an ethylene propylene rubber (EPR rubber). Preferably, the EPR rubber has an ethylene content of, for instance 20-70% and more preferably of 50-65 wt. %.

The polypropylene may also contain a modified polypropylene. Examples of suitable modified polypropylenes are polypropylenes grafted with for instance an unsaturated organic compound, for instance a carboxylic acid, an anhydride, an ester, or salts thereof or maleic, fumaric, (meth) acrylic, itaconic or cinnamic acid or anhydride, ester or salt thereof. Preferably maleic anhydride is used. The amount of modified polypropylene may vary within wide limits. For economical reasons the amount normally will be rather low, for instance lower than 10 wt. %, preferably 0-3 wt. % modified polypropylene calculated with respect to the total amount of polypropylene.

The composition according to the invention contains 2-20 wt. % long-chain branched low density polyethylene (LDPE).

According to a preferred embodiment of the invention the composition contains 5-15 wt. % long-chain branched low density polyethylene.

Long-chain branching describes the configuration of the polymer molecule possessing side chains with a degree of polymerization of the same order as that of the main chain.

The density of the polyethylene ranges between 910 kg/m$^3$ and 935 kg/m$^3$ and the melt index ranges between 0.10 dg/minute and 100 dg/minute preferably between 8 to 80 g/10 min (the MFI is measured in accordance with ISO 1133 using a 2.16 kg weight and at a temperature of 190° C.).

Preferably, the density of the polyethylene ranges between 915 kg/m$^3$ and 935 kg/m$^3$ Preferably, the melt index of the polyethylene ranges between 50 and 70 g/10 min.

The composition according to the invention comprises 1-20 wt. % of a copolymer of ethylene and a $C_3$-$C_{20}$ α-olefin.

The copolymer of ethylene and a $C_3$-$C_{20}$ α-olefin has a density between 840 and 890 kg/m$^3$.

The MFI of the copolymer of ethylene and a $C_3$-$C_{20}$ α-olefin is between 0.1 and 100 g/10 min (measured in accordance with ISO 1133 using a 2.16 kg weight and at a temperature of 190° C.).

Preferably the density of the copolymer of ethylene and a $C_3$-$C_{20}$ α-olefin is between 860 and 880 kg/m$^3$.

Preferably the MFI of the copolymer of ethylene and a $C_3$-$C_{20}$ α-olefin is between 0.1 and 10 g/10 min.

The composition according to the invention may comprise a mixture of copolymers of ethylene and a $C_3$-$C_{20}$ α-olefin.

Preferably the polypropylene composition according to the invention comprises 1-18 wt. % of the copolymer of ethylene and a $C_3$-$C_{20}$ α-olefin.

According to a further preferred embodiment of the invention the polypropylene composition comprises 5-15 wt. % of the copolymer of ethylene and a $C_3$-$C_{20}$ α-olefin.

Suitable fillers include for example talc, glass beads, glass fibers, clay, mica, wollastonite, calcium carbonate, silica, carbon black and/or titanium oxide. According to a preferred embodiment of the invention the filler is talc, glass fiber or carbon black.

The amount of filler in the polypropylene composition according to the invention is between 0.5 and 60 wt. %. Fillers amounts above 40 wt. % will normally be present in mixtures of a homopolymer of polypropylene and filler or in concentrates (i.e. compositions that normally will be mixed with other compositions before being further processed, for instance moulded).

Compositions used for further processing into articles, for instance by blow moulding, injection moulding, extrusion, or extrusion compression moulding, preferably contain for instance more than 1 wt. % filler, particularly more than 2 wt. % filler, most preferably more than 5 wt. % filler and less than 45 wt. % filler, particularly less than 30 wt. % filler, most preferably less than 20 wt. % filler.

Preferably, the composition according to the invention comprises in addition to said components a slip agent. The amount of slip agent to be used may range between wide limits, for instance between 0 and 3 wt. %. Preferably the amount of slip agent ranges between 0.1 and 1 wt. %, calculated with respect to the polypropylene composition.

Suitable slip agents include for example fatty acid amides and/or polysiloxanes.

Suitable fatty acid amides are for instance saturated and unsaturated amides or saturated and unsaturated alkylenebisamides. Examples of suitable amides include palmitamide, stearyl arachideamide, stearamideoethylstearamide, stearamidoethylpalmitamide, erucamide, oleamide, erucamidoethylerucamide, stearamidoethylerucamide and/or oleoamidoethylerucamide.

According to a preferred embodiment of the invention the slip agent is a fatty acid amide.

The composition according to the invention may optionally contain additives, for instance nucleating agents and clarifiers, stabilizers, release agents, fillers, plasticizers, anti-oxidants, colorants, ignition resistant additives, lubricants, mold releases, flow enhancers and/or antistatics. These additives are well known in the art and the skilled person will select the type and amount of additives such that they do not detrimentally influence the aimed properties of the composition. The amount of additives may vary between wide limits, for instance from 0 up to 20 wt. %, particularly between 1 and 10 wt. %, calculated with respect to the polypropylene composition.

The propylene copolymer composition according to the invention is suitable to be used for instance in blow molding, injection molding or extrusion of moldings, films, sheets or pipes to be applied in a wide range of articles such as for instance, exterior and interior automotive parts, especially esthetic (non painted visible) parts, such as for example bumper beams, bumper fascia, instrument panels and pillars, thin wall packaging, caps and closures, pails and containers, crates and boxes, cans and bottles, appliance housings, houseware, toys, multi-media packaging, electrical applications, for example electrical equipment housing, lawn and garden furniture and construction sheet.

The propylene copolymer composition according to the invention is very suitable to be applied in visible interior automotive parts such as for example instrument panels and pillars.

The preparation of the compositions according to the invention may be performed according to any suitable mixing procedure. Such procedures are well known in the art such as for example dry blending the individual components, optionally followed by melt mixing, and subsequently extrusion or directly injection moulding.

The invention will be elucidated by the following examples without, however, being restricted thereto.

EXAMPLES

Example I

A composition was obtained by compounding the ingredients according to Table 1 at 210° C. in a co-rotating twin-screw extruder. The composition was then injection moulded into plates of 65×65×3.2 mm according to ISO 37-2. The appropriate samples were machined out of the plates.

The test results are given in Table 1. The amounts used are given in wt. % calculated with respect of the total composition.

Comparative Example A

Example I was repeated except that LDPE was replaced by HDPE.

The composition and test results of the composition are given in Table 1

The test result shows that the specific combination of the branched low density polyethylene and the copolymer of ethylene and a $C_3$-$C_{20}$ α-olefin in the polypropylene composition enhances the scratch resistance.

TABLE 1

| Composition | | Example I | Comparative Example A |
|---|---|---|---|
| Polypropylene[1] | wt. % | 59.3 | 59.3 |
| LDPE[2] | wt. % | 8 | — |
| HDPE[3] | wt. % | — | 8 |
| Copolymer[4] | wt. % | 10 | 10 |
| Filler[5] | wt. % | 20 | 20 |
| Slip Agent[6] | wt. % | 0.6 | 0.6 |
| Additives[7] | wt. % | 2.1 | 2.1 |
| MFI (ISO 1133) | dg/min | 27 | 25 |
| Izod Impact (notched) @ 0° C. (ISO 180 4A) | kJ/m$^2$ | 6 | 7 |
| Izod Impact (notched) @ 23° C. (ISO 180 4A) | kJ/m$^2$ | 34 | 24 |
| E-modulus ASTM D790) | N/mm$^2$ | 1600 | 1700 |
| Shrink (ISO 294 3&4) | % | 0.77 | 0.79 |
| Scratch Resistance dL | | 0.5 | 2.1 |
| Elongation at break (ISO R 37/2) | % | 100 | 73 |

[1]= SABIC Polypropylene copolymer (density = 0.905 g/cm$^3$; MFI = 40 g/10 min; E-modulus = 1400 N/mm$^2$);
[2]= SABIC LDPE (density 0.919 g/cm$^3$; MFI = 65 g/10 min);
[3]= DEX Plastomers HDPE STAMYLEX 9089
[4]= Engage ® 8200 of DOW
[5]= Talc Steamic ® OOS D of Luzenac;
[6]= oleamide (UNISLIP 1759 of CIBA)
[7]= 0.1 wt. % Irganox B225 of CIBA and 2 wt. % colour master batch containing 40 wt. % carbon black The scratch resistance was measured according to the VW PV 3952 scratch method with a load of 10N using VW texture K59. (VW means Volkswagen)

The colour of the scratch was measured relative to the unscratched surface. The colour was measured according to ISO 7724 (1984). The resulting value dL is a measure for the scratch resistance because a low dL value corresponds to a high scratch resistance.

The invention claimed is:

1. A polypropylene composition comprising:
   (i) 30-97 wt. % of a polypropylene;
   (ii) 2-20 wt. % of a long chain branched low density polyethylene with a density between 910 and 935 kg/m$^3$ and a Melt Flow Index (MFI) between 0.1 and 100 g/10 min;
   (iii) 1-20 wt. % of a copolymer of ethylene and a $C_3$-$C_{20}$ α-olefin with a density between 840 and 890 kg/m$^3$ and a Melt Flow Index (MFI) between 0.1 and 100 g/10 min; and
   (iv) 0.5-60 wt. % of a filler,
   wherein wt. % are calculated on the total amount of the polypropylene composition.

2. The composition according to claim 1, wherein the amount of the branched low density polyethylene is between 5 and 15 wt. %.

3. The composition according to claim 1, wherein the density of the branched low density polyethylene is between 915 and 925 kg/m$^3$.

4. The composition according to claim 1, wherein the branched low density polyethylene has a Melt Flow Index between 8 and 80 g/10 min.

5. The composition according to claim 1, wherein the amount of the copolymer of ethylene and a $C_3$-$C_{20}$ α-olefin is between 1 and 18 wt. %.

6. The composition according to claim 1, wherein the copolymer of ethylene and a $C_3$-$C_{20}$ α-olefin has a density between 860 and 880 kg/m$^3$.

7. The composition according to claim 1, wherein the MFI of he copolymer of ethylene and a $C_3$-$C_{20}$ α-olefin is between 0.1 and 10 g/10 min.

8. The composition according to claim 1, wherein the composition comprises between 60 and 80 wt. % of a polypropylene.

9. The composition according to claim 1, wherein the composition in addition comprises a slip agent.

10. The composition according to claim 1, wherein the amount of filler is 1-45 wt. %.

11. An article comprising a polypropylene composition comprising:
    (i) 30-97 wt. % of a polypropylene;
    (ii) 2-20 wt. % of a long chain branched low density polyethylene with a density between 910 and 935 kg/m$^3$ and a Melt Flow Index (MFI) between 0.1 and 100 g/10 min;
    (iii) 1-20 wt. % of a copolymer of ethylene and a $C_3$-$C_{20}$ α-olefin with a density between 840 and 890 kg/m$^3$ and a Melt Flow Index (MFI) between 0.1 and 100 g/10 min; and
    (iv) 0.5 -60 wt. % of a filler,
    wherein wt. % are calculated on the total amount of the polypropylene composition.

12. An interior automotive part comprising a polypropylene composition comprising:
    (i) 30-97 wt. % of a polypropylene;
    (ii) 2-20 wt. % of a long chain branched low density polyethylene with a density between 910 and 935 kg/m$^3$ and a Melt Flow Index (MFI) between 0.1 and 100 g/10 min;
    (iii) 1-20 wt. % of a copolymer of ethylene and a $C_3$-$C_{20}$ α-olefin with a density between 840 and 890 kg/m$^3$ and a Melt Flow Index (MFI) between 0.1 and 100 g/10 min; and
    (iv) 0.5 -60 wt. % of a filler,
    wherein wt. % are calculated on the total amount of the polypropylene composition.

13. The composition according to claim 1, wherein the amount of filler is more than 5 wt. % and less than 45 wt. %.

14. The composition according to claim 4, wherein the polypropylene has a Melt Flow Index between 10 and 100 g/10 min.

15. A polypropylene composition consisting essentially of:
    (i) 30-97 wt. % of a polypropylene;
    (ii) 2-20 wt. % of a long chain branched low density polyethylene with a density between 910 and 935 kg/m$^3$ and a Melt Flow Index (MF1) between 0.1 and 100 g/10 min;
    (iii) 1-20 wt.% of a copolymer of ethylene and a $C_3$-$C_{20}$ a-olefin with a density between 840 and 890 kg/m$^3$ and a Melt Flow Index (MFI) between 0.1 and 100 g/10 min; and
    (iv) 0.5 -60 wt. % of a filler,
    wherein wt. % are calculated on the total amount of the polypropylene composition.

\* \* \* \* \*